United States Patent
Houck (10) Patent No.: US 12,014,528 B2
(45) Date of Patent: Jun. 18, 2024

(54) OPTICAL DEVICE

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 729 days.

(21) Appl. No.: 17/248,212

(22) Filed: Jan. 14, 2021

(65) Prior Publication Data

US 2022/0222478 A1     Jul. 14, 2022

(51) Int. Cl.
*G06K 9/00*     (2022.01)
*G02B 5/00*     (2006.01)
(Continued)

(52) U.S. Cl.
CPC ........... *G06V 10/147* (2022.01); *G02B 5/003* (2013.01); *G02B 5/0278* (2013.01); *G06F 3/14* (2013.01);
(Continued)

(58) Field of Classification Search
CPC ...... G06F 3/0412; G06F 3/042; G06F 3/0421; G06F 21/32; G06F 2203/04112; G06F 3/0443; G06F 3/0446; G06F 3/0445; G06F 1/163; G06F 3/016; G06F 3/04164; G06F 2203/013; G06F 2203/0338;
(Continued)

(56) References Cited

U.S. PATENT DOCUMENTS

| 2014/0071155 A1* | 3/2014 | Pauly | G02B 27/095 |
| | | | 345/596 |
| 2016/0057555 A1* | 2/2016 | Schuster | G06F 3/011 |
| | | | 381/59 |

(Continued)

FOREIGN PATENT DOCUMENTS

WO    2020061845 A1    4/2020

OTHER PUBLICATIONS

Nicholas Antipa, "Lensless Computational Imaging using Random Optics," Technical Report No. UCB/EECS-2020-175, Aug. 19, 2020, 140 Pages.

(Continued)

*Primary Examiner* — Alex Kok S Liew
(74) *Attorney, Agent, or Firm* — Harrity & Harrity, LLP (57) ABSTRACT

An optical device includes an optical sensor, one or more diffusive optical elements disposed on a surface of a display screen and configured to diffuse and to distribute a first portion of light associated with a subject across an array of sensor elements of the optical sensor, and one or more processors. The display screen includes one or more transmissive components that allow the first portion of light to pass through the display screen via the surface of the display screen, and one or more blocking components that prevent a second portion of light associated with the subject from passing through the display screen. The one or more processors are configured to obtain, from the optical sensor, sensor data associated with the first portion of light, process the sensor data to determine an image of the subject, and perform one or more actions based on the image of the subject.

20 Claims, 8 Drawing Sheets

(51) Int. Cl.
| | |
|---|---|
| *G02B 5/02* | (2006.01) |
| *G06F 3/14* | (2006.01) |
| *G06F 18/214* | (2023.01) |
| *G06N 5/04* | (2023.01) |
| *G06N 20/00* | (2019.01) |
| *G06V 10/147* | (2022.01) |
| *G06V 40/16* | (2022.01) |
| *H04N 23/57* | (2023.01) |

(52) U.S. Cl.
CPC ............ *G06F 18/214* (2023.01); *G06N 5/04* (2013.01); *G06N 20/00* (2019.01); *G06V 40/172* (2022.01); *H04N 23/57* (2023.01)

(58) Field of Classification Search
CPC . G06F 2203/04103; G06F 2203/04109; G06F 2203/04111; G06F 3/011; G09G 3/3233; G09G 2300/0819; G09G 2310/08; G09G 3/3266; G09G 2300/0842; G09G 2310/0286; G09G 2320/0295; G09G 2300/0861; G09G 2320/0233
See application file for complete search history.

(56) References Cited

U.S. PATENT DOCUMENTS

2018/0260602 A1\* 9/2018 He ...................... A61B 5/0075
2019/0080188 A1 3/2019 Zhou et al.

OTHER PUBLICATIONS

Kuo et al., "DiffuserCam: Diffuser-Based Lensless Cameras," Imaging and Applied Optics, 2017, 3 Pages.

Monakhova et al., "Learned reconstructions for practical mask-based lensless imaging," Optics Express, vol. 27, No. 20, Sep. 30, 2019, 16 Pages.

Extended European Search Report for Application No. EP21203950.7, dated Jul. 15, 2022, 13 pages.

\* cited by examiner

OPTICAL DEVICE

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths.

SUMMARY

In some implementations, an optical device includes an optical sensor comprising an array of sensor elements; one or more diffusive optical elements disposed on a surface of a display screen and configured to diffuse and to distribute a first portion of light associated with a subject across the array of sensor elements of the optical sensor, wherein the display screen comprises one or more transmissive components that allow the first portion of light to pass through the display screen via the surface of the display screen, and wherein the display screen comprises one or more blocking components that prevent a second portion of light associated with the subject from passing through the display screen; and one or more processors configured to: obtain, from the optical sensor, sensor data associated with the first portion of light; process the sensor data to determine an image of the subject; and perform one or more actions based on the image of the subject.

In some implementations, a non-transitory computer-readable medium storing instructions includes one or more instructions that, when executed by one or more processors of an optical device, cause the one or more processors to: obtain, from an optical sensor of the optical device, sensor data associated with a portion of light that is associated with a subject and that is diffused and distributed across an input surface of the optical sensor by one or more diffusive optical elements disposed on a surface of a display screen, wherein the display screen comprises one or more transmissive components that allow the portion of light to pass through the display screen, and wherein the display screen comprises one or more blocking components that prevent a different portion of light associated with the subject from passing through the display screen; process the sensor data to determine an image of the subject; and provide the image of the subject.

In some implementations, a method includes obtaining, by an optical device and from an optical sensor of the optical device, sensor data associated with a portion of light that is associated with a subject that is passed by a display screen and that is diffused and distributed in a caustic pattern across an input surface of the optical sensor by one or more diffusive optical elements; processing, by the optical device and based on the caustic pattern, the sensor data to determine an image of the subject; and performing, by the optical device, one or more actions based on the image of the subject.

DETAILED DESCRIPTION

The following detailed description of example implementations refers to the accompanying drawings. The same reference numbers in different drawings may identify the same or similar elements.

A user device, such as a mobile phone, includes a display screen (e.g., on a front surface of the user device) for displaying information to a user of the user device. Often, the user device includes a conventional front-facing camera that is positioned next to the display screen on the front surface of the user device. For example, the conventional front-facing camera may be positioned on the front surface between the display screen and a bezel of the user device. The conventional front-facing camera can be used to obtain an image of a subject, such as for an identification and/or authentication application (e.g., to determine whether a user of the user device is allowed to interact with the user device). However, due to a footprint of the conventional front-facing camera, positioning the front-facing camera next to the display screen increases a footprint of the user device and causes the user device to include a "blank" region on the front surface of the user device that does not include the display screen.

Moreover, recent attempts to position a conventional front-facing camera behind the display screen have not been successful because circuitry components of the display screen obstruct portions of the conventional front-facing camera and reduce an amount of light that passes to the front-facing camera. This causes the front-facing camera to capture an incomplete, inaccurate, and/or low-quality image of a subject. Such an image is not suitable for use by an identification and/or authentication application. Further, the conventional front-facing camera includes an imaging lens, which requires the conventional front-facing camera to have a thickness that prevents the conventional front-facing camera from being positioned behind the display screen for user devices that require a small form factor.

Some implementations described herein provide an optical device that includes an optical sensor, one or more diffusive optical elements disposed on a surface of a display screen (e.g., of a user device) and configured to diffuse and to distribute a first portion of light associated with a subject across an array of sensor elements of the optical sensor, and one or more processors. The display screen may include one or more transmissive components that allow the first portion of light to pass through the display screen via the surface of the display screen and one or more blocking components that prevent a second portion of light associated with the subject from passing through the display screen. The one or more processors may be configured to obtain, from the optical sensor, sensor data associated with the first portion of light (e.g., the portion of light that has passed through the display screen). The one or more processors may process the sensor data to determine an image of the subject. For example, the one or more processors may process the sensor data using an algorithm that is configured to construct an image of the subject based on a pattern, such as a caustic pattern, in which the one or more diffusive optical elements diffused and distributed the first portion of light on the array of sensor elements of the optical sensor to determine the image of the subject. The one or more processors may perform one or more actions based on the image of the subject (e.g., analyze the image to identify and/or authenticate the subject).

In this way, the optical device described herein is able to determine a complete, accurate, and high-quality image of the subject (e.g., for identification and/or authentication applications) just based on the first portion of light that passes through the display screen, which is not possible using a conventional front-facing camera. Further, a circuitry architecture of the display screen does not need to be modified (e.g., to reduce a density of pixel components over the optical device) to allow the optical device to determine the image of the subject, which enables a consistent density of pixel components on the display screen and thereby reduces a design complexity associated with designing, assembling, and/or maintaining the display screen, the optical device, and/or the user device. Additionally, the optical device does not include a lens, which allows the optical device to be thinner than a conventional front-facing camera. This allows the optical device to be incorporated into user devices (e.g., positioned behind the display screen) that require a small form factor, which may not be possible for a conventional front-facing camera.

Figure 1A:
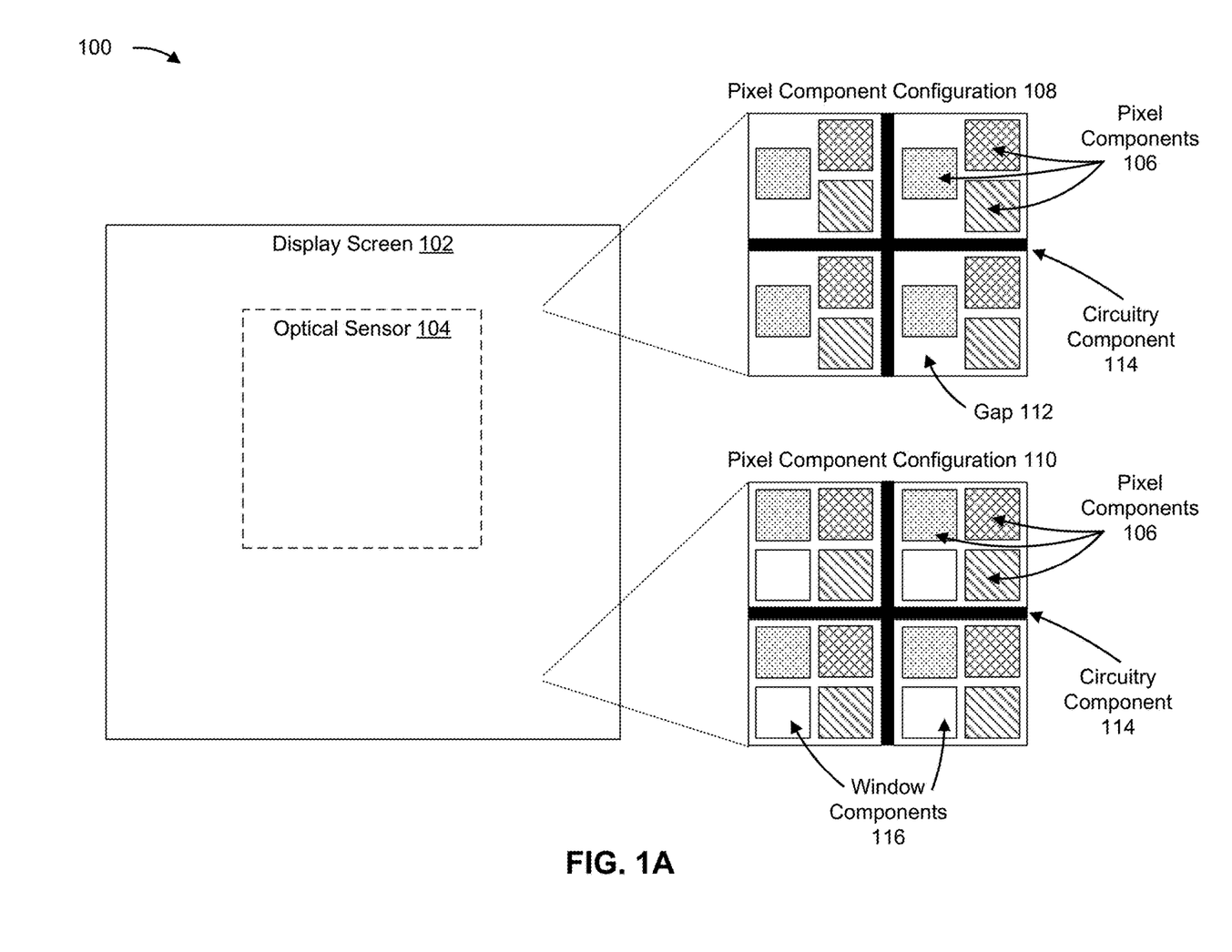
FIGS. 1A-1B are diagrams of an example implementation described herein.
Figure 1B:
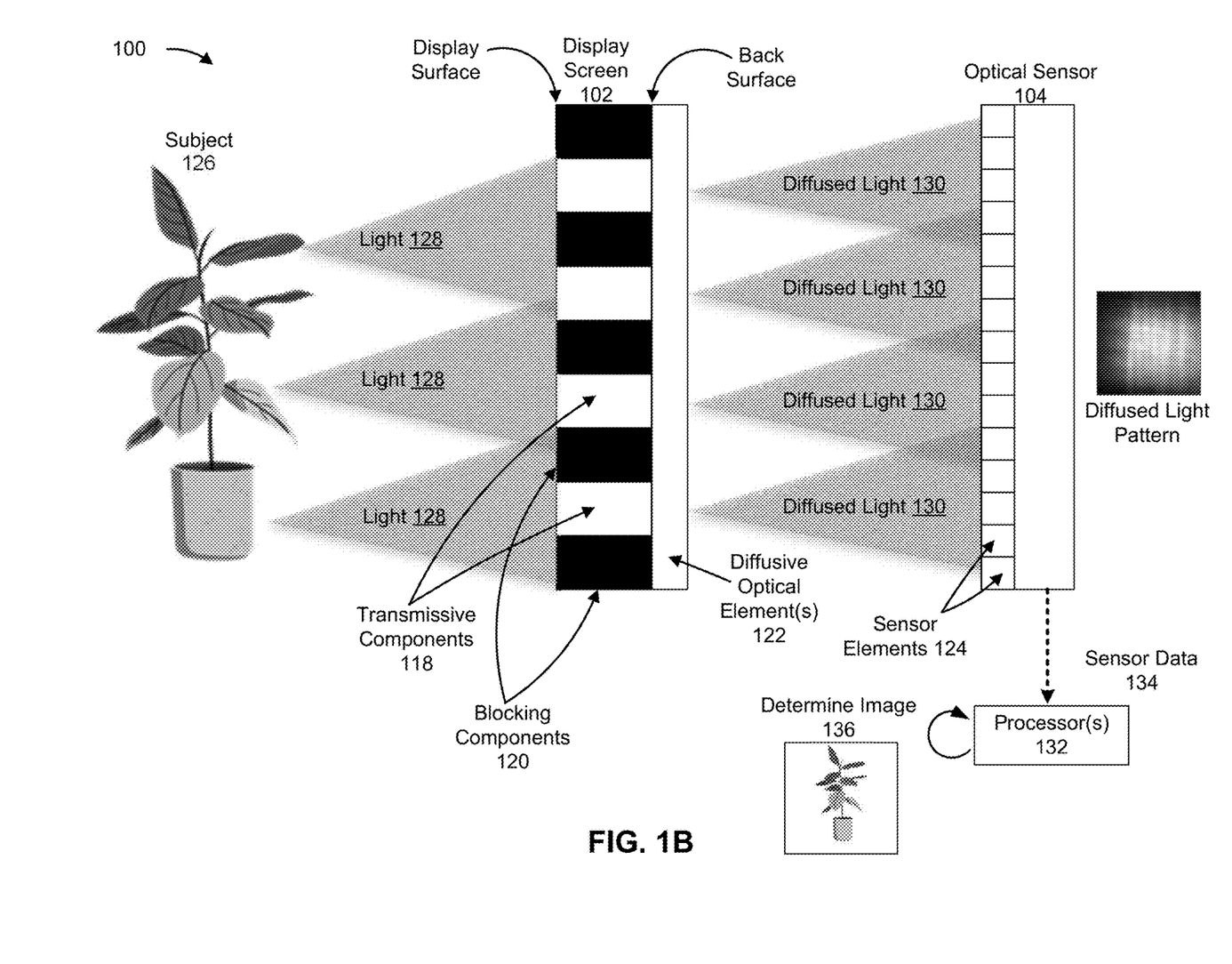

FIGS. 1A-1B are diagrams of an overview of an example implementation 100 described herein. As shown in FIG. 1A, example implementation 100 includes a display screen 102 and an optical sensor 104. The display screen 102 may be a liquid crystal display (LCD) display screen, a light emitting diode (LED) display screen, or an organic light emitting diode (OLED) display screen, among other examples. The display screen 102 and/or the optical sensor 104 may be associated with an optical device, which is described in more detail elsewhere herein.

As further shown in FIG. 1A, the display screen 102 may include one or more pixel components 106. A pixel component 106 may be configured to emit light (e.g., via a display surface of the display screen 102) associated with a particular wavelength or wavelength range. For example, as shown in FIG. 1A, a first pixel component 106 with gray shading may be configured to emit light associated with a first wavelength range (e.g., red light), a second pixel component 106 with diamond patterning may be configured to emit light associated with a second wavelength range (e.g., blue light), and a third pixel component 106 with diagonal patterning may be configured to emit light associated with a third wavelength range (e.g., green light). In some implementations, a pixel component 106 may be configured to allow light (e.g., ambient light) to pass through the pixel component 106 (e.g., when the pixel component 106 is emitting or not emitting light). For example, ambient light may transmit through the display surface of the display screen 102 via the pixel component 106 (e.g., to the optical sensor 104).

The one or more pixel components 106 may be arranged in a pixel component configuration on the display screen 102. For example, FIG. 1A shows a pixel component configuration 108 and a pixel component configuration 110, but other pixel component configurations are also contemplated. As shown in FIG. 1A, the pixel component configuration 108 may group a set of pixel components 106 (e.g., comprising the first pixel component 106, the second pixel component 106, and the third pixel component 106) in a region on the display screen 102. One or more gaps 112 may exist between the set of pixel components 106 within the region. In some implementations, a gap 112 may be transparent or otherwise configured to allow light (e.g., ambient light) to pass through the gap 112. For example, ambient light may transmit through the display surface of the display screen 102 via the gap 112 (e.g., to the optical sensor 104).

As further shown in the pixel component configuration 108, the display screen 102 may include one or more circuitry components 114. A circuitry component 114 may include circuitry or other structures and/or elements configured to facilitate operation of the display screen 102 and/or the one or more pixel components 106. In some implementations, a circuitry component 114 may block or otherwise be configured to prevent light (e.g., ambient light) from passing through the circuitry component 114. For example, the circuitry component 114 may prevent ambient light from transmitting through the display surface of the display screen 102 via the circuitry component 114 (e.g., to the optical sensor 104).

As further shown in FIG. 1A, the pixel component configuration 110 may group a set of pixel components 106 (e.g., comprising the first pixel component 106, the second pixel component 106, and the third pixel component 106) with one or more window components 116 in a region on the display screen 102. A window component 116 may be transparent or otherwise configured to allow light (e.g., ambient light) to pass through the window component 116. For example, ambient light may transmit through the display surface of the display screen 102 via the window component 116 (e.g., to the optical sensor 104). In some implementations, the window component 116 may be configured to allow light associated with one or more wavelengths or wavelength ranges to pass through the window component 116 and/or to prevent light associated with one or more different wavelengths or different wavelength ranges from passing through the window component 116. In some implementations, the window component 116 may comprise one or more diffusive optical elements (e.g., that are included in or separate from the one or more diffusive optical elements 122 described herein) to diffuse light that passes through the window component 116.

As shown in FIG. 1B, the display screen 102 may comprise one or more transmissive components 118 and/or one or more blocking components 120. The one or more transmissive components 118 may include the one or more pixel components 106, the one or more gaps 112, the one or more window components 116, and/or other components of the display screen 102 that allow light to pass through the display screen 102 (e.g., via the display surface of the display screen 102). The one or more blocking components 120 may include the one or more circuitry components and/or other components of the display screen 102 that prevent light from passing through the display screen 102 (e.g., via the display surface of the display screen 102).

In some implementations, one or more diffusive optical elements 122 may be disposed between the display screen 102 and the optical sensor 104 (e.g., an input surface of the optical sensor 104). A diffusive optical element 122 may include an optical diffuser and/or any other type of optical structure to diffuse light. For example, the one or more diffusive optical elements 122 may be configured to diffuse and to distribute light that is passed through the display screen 102 by the one or more transmissive components 118 across the input surface of the optical sensor 104. In some implementations, the one or more diffusive optical elements 122 may be configured to diffuse and to distribute the light in a pattern (e.g., a caustic pattern associated with at least one point spread function (PSF)) across the input surface of the optical sensor 104. As shown in FIG. 1B, the one or more diffusive optical elements 122 may be disposed on a surface of the display screen 102, such as a "back" surface (e.g., a non-display surface) of the display screen 102. In some implementations, the one or more diffusive optical elements 122 may be disposed on the display surface of the display screen 102 or may be integrated into the display screen 102 (e.g., on the one or more pixel components 106, the one or more gaps 112, the one or more window components, and/or the like, within a housing of the display screen 102).

As further shown in FIG. 1B, the optical sensor 104 may include one or more sensor elements 124 (e.g., an array of sensor elements, also referred to herein as a sensor array), each configured to obtain information. For example, a sensor element 124 may provide an indication of intensity of light that is incident on the sensor element 124 (e.g., active/inactive or a more granular indication of intensity). As another example, a sensor element 124 may provide an indication of a wavelength or wavelength range of light that is incident on the sensor element 124 (e.g., red light, blue light, green light, ultraviolet light, infrared light, and/or the like). The optical sensor 104 may be configured to collect the information obtained by the one or more sensor elements 124 to generate sensor data.

In an example, an optical device (e.g., that comprises the display screen 102, the one or more diffusive optical elements 122, and/or the optical sensor 104) may be configured to capture information relating to a subject 126 (e.g., a potted plant, as shown in FIG. 1B). As shown in FIG. 1B, light 128 may originate from one or more points of the subject 126 (e.g., light from a light source that is reflected from the one or more points of the subject 126) and may be received by the optical device (e.g., the subject 126 may be in a field of view of the optical device). A first portion of the light 128 may enter the display screen 102 via the display surface of the display screen 102 and may be passed through the display screen 102 (e.g., may be allowed to transmit through the display screen 102 to the back surface of the display screen 102) by the one or more transmissive components 118. A second portion of the light 128 may be blocked from passing through the display screen 102 by the one or more blocking components 120.

The first portion of the light 128 may be diffused by the one or more diffusive optical elements 122 (e.g., before the first portion of the light passes through the display screen 102, as the first portion of the light passes through the display screen 102, after the first portion of the light passes through the display screen 102, and/or the like) to form diffused light 130. The diffused light 130 may be distributed across the one or more sensor elements 124 of the optical sensor 104 by the one or more diffusive optical elements 122. In some implementations, the diffused light 130 may be distributed across the one or more sensor elements 124 in a pattern (e.g., the diffused light pattern shown in FIG. 1B), such as a caustic pattern.

As further shown in FIG. 1B, the optical device may be associated with one or more processors 132 and may provide, as shown by reference number 134, sensor data to the one or more processors 132. The sensor data may indicate information relating to the light 128 that originated at the subject 126 and/or the diffused light 130 that was distributed across the one or more sensor elements 124. For example, the one or more sensor elements 124 may generate the sensor data based on receiving the diffused light 130 and the optical sensor 104 may send the sensor data to the one or more processors 132.

As further shown in FIG. 1B, and reference number 136, the one or more processors 132 may process the sensor data to determine (e.g., generate, construct, create, and/or the like) an image of the subject 126 (e.g., an image of the potted plant). For example, the one or more processors 132 may identify (e.g., by searching a data structure associated with the one or more processors 132) an algorithm for constructing an image based on light diffused by the one or more diffusive optical elements 122 and may process the sensor data using the algorithm to determine the image of the subject 126. In some implementations, the algorithm may be configured to construct the image of the subject 126 based on a pattern (e.g., a caustic pattern) in which the one or more diffusive optical elements 122 distributed the diffused light 130 on the one or more sensor elements 124.

In some implementations, the one or more processors 132 may determine calibration information associated with a circuitry architecture of the display screen 102. The calibration information may indicate location information associated with the one or more transmissive components 118, the one or more blocking components 120, and/or the like, and/or may indicate how diffused light is distributed across the one or more sensor elements 124 by the one or more diffusive optical elements 122 based on the location information. Accordingly, the one or more processors 132 may optimize the algorithm based on the calibration information. For example, the one or more processors 132 may identify, based on the calibration information, a set of sensor elements 124 that is associated with a subset of data, of the sensor data, that is more likely to facilitate accurate construction of the image of the subject 126 than other sensor elements 124 of the one or more sensor elements 124. Accordingly, the one or more processors 132 may optimize the algorithm to favor the set of sensor elements 124, over the other sensor elements 124, to determine the image of the subject 126 based on the sensor data. In this way, the one or more processors 132 may generate a more accurate image of the subject 126 than by using an unoptimized algorithm and/or may conserve computing resources (e.g., processing resources, memory resources, communication resources, and/or power resources, among other examples) that would otherwise be consumed when using an unoptimized algorithm.

In some implementations, the sensor data may include a first set of data associated with the diffused light 130 and a second set of data associated with additional light, such as light emitted by the one or more pixel components 106 of the display screen 102. The one or more processors 132 may process the sensor data to identify the first set of sensor data and the second set of sensor data and may process the first set of sensor data (e.g., using the algorithm described above), and not the second set of sensor data, to determine the image of the subject 126. For example, the one or more processors 132 may computationally remove the second set of sensor data (e.g., that is associated with light emitted by the one or more pixel components 106) before processing the sensor data to determine the image of the subject 126. In this way, the one or more processors 132 may generate an image of the subject 126 based on the light 128 that originated from the subject 126, and thereby provide a more accurate image of the subject 126 than would otherwise be determined based on all of the light received by the one or more sensor elements 124.

In some implementations, the one or more processors 132 may use a machine learning model to process the sensor data to determine the image of the subject 126. The machine learning model may have been trained based on training data that may include example sensor data, information related to example patterns (e.g., caustic patterns) of diffused light distributed across sensor elements associated with the example sensor data, and/or example images associated with the example sensor data. Using the training data as input to the machine learning model, the machine learning model may be trained to identify one or more relationships (e.g., between the example sensor data, the information related to example patterns, and/or the example images) to determine an image of a subject. The machine learning model may be trained and/or used in a similar manner to that described below with respect to FIG. 2. The one or more processors 132 may include one or more devices (e.g., one or more data storage devices) that store the machine learning model.

In some implementations, the one or more processors 132 may cause display of the image of the subject 126 on the display screen 102. For example, the one or more processors 132 may send the image of the subject 126 to the display screen 102 to cause the display screen 102 to display the image of the subject 126. As another example, when the display screen 102 is included in another device, such as a user device, the one or more processors 132 may send the image of the subject 126 to the user device to cause the user device to display the image of the subject 126 on the display screen 102.

In some implementations, the one or more processors 132 may process the image of the subject 126 using biometric analysis. For example, the one or more processors 132 may process the image of the subject 126 using facial recognition analysis (e.g., when the subject 126 is a face of a user of the optical device). Additionally, or alternatively, the one or more processors 132 may process the image of the subject 126 using vein (e.g., of a body part) recognition analysis, hand recognition analysis, and/or the like. In some implementations, the one or more processors 132 may obtain multiple images of the subject 126 and may process the images using a gesture analysis, a movement analysis, and/or the like. In some implementations, the one or more processors 132 may send the image, or images, of the subject 126 to another device, such as a user device associated with the display screen 102, to analyze the image or images as described above. In this way, the one or more processors 132 may facilitate identification and/or authentication of a user of the optical device (e.g., to allow the user to interact with the display screen 102 and/or a user device associated with the display screen 102).

In some implementations, when a machine learning model is used to determine the image of the subject 126, the one or more processors 132 may retrain the machine learning model based on the image of the subject 126. For example, the content system may use the image of the subject 126 as additional training data to retrain and/or update the machine learning model. In this way, the one or more processors 132 may improve the accuracy of the machine learning model, which may improve a speed and/or an efficiency of the machine learning model, which conserves computing resources of the one or more processors 132.

As indicated above, FIGS. 1A and 1B are provided as one or more examples. Other examples may differ from what is described with regard to FIGS. 1A and 1B.

Figure 2:
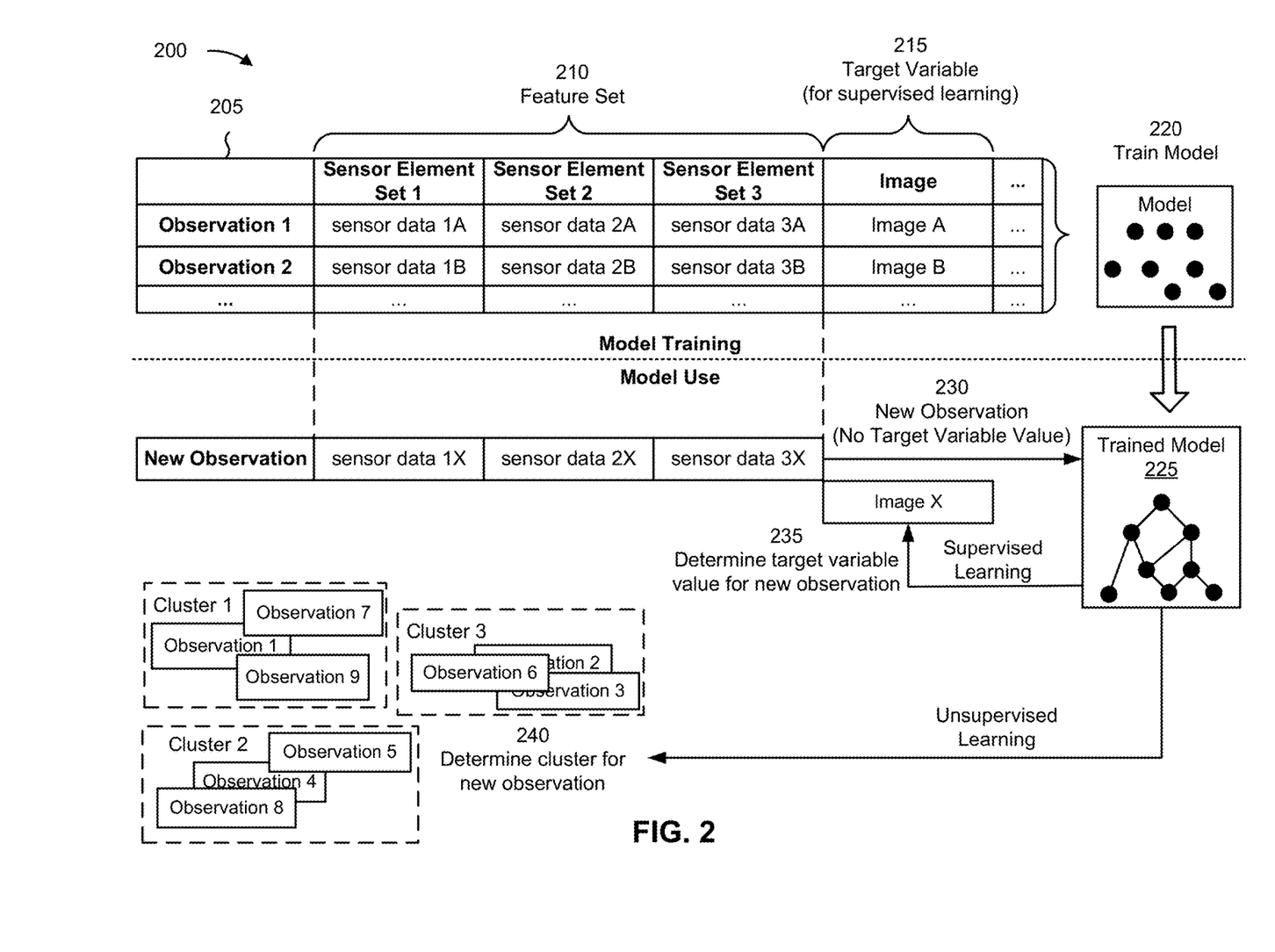
FIG. 2 is a diagram illustrating an example of training and using a machine learning model in connection with determining an image of a subject.

FIG. 2 is a diagram illustrating an example 200 of training and using a machine learning model in connection with determining an image of a subject. The machine learning model training and usage described herein may be performed using a machine learning system. The machine learning system may include or may be included in a computing device, a server, a cloud computing environment, or the like, such as the one or more processors 132 and/or a user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the optical sensor 104, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the optical sensor 104. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of sensor element set 1 (e.g., of the one or more sensor elements 124), a second feature of sensor element set 2, a third feature of sensor element set 3, and so on. As shown, for a first observation, the first feature may have a value of sensor data 1A, the second feature may have a value of sensor data 2A, the third feature may have a value of sensor data 3A, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an image of a subject (e.g., that is associated with the feature set), which has a value of image A for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of sensor data 1X, a second feature of sensor data 2X, a third feature of sensor data 3X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of image X for the target variable of image of a subject for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first automated action may include, for example, displaying the image of the subject on the display screen 102.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., image of a face), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determining an image of a subject from sensor data. The machine learning system enables recognition and/or identification of tens, hundreds, thousands, or millions of features and/or feature values for tens, hundreds, thousands, or millions of observations, thereby increasing accuracy and consistency and reducing delay associated with determining an image of a subject from sensor data relative to requiring computing resources to be allocated for tens, hundreds, or thousands of operators to manually determine an image of a subject using the features or feature values.

As indicated above, FIG. 2 is provided as an example. Other examples may differ from what is described in connection with FIG. 2.

Figure 3:
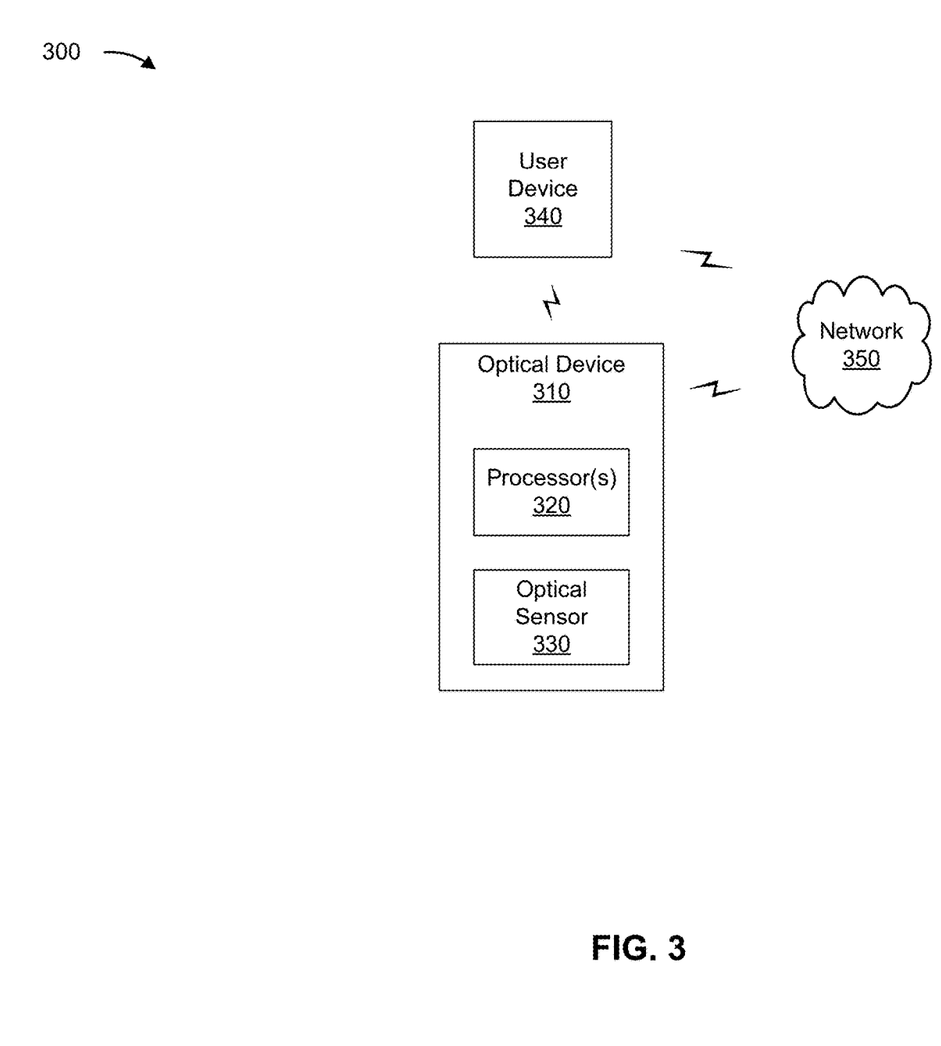
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an optical device 310 that may include one or more processors 320 (e.g., that correspond to the one or more processors 126 described herein in relation to FIGS. 1A and 1B) and an optical sensor 330 (e.g., that corresponds to the optical sensor 104 described herein in relation to FIGS. 1A and 1B). The environment 300 may also include a user device 340 and a network 350. Devices of environment 300 may interconnect via wired connections, wireless connections, or a combination of wired and wireless connections.

Optical device 310 may include an optical device capable of determining, storing, processing, and/or routing an image associated with a subject. In some implementations, optical device 310 may be incorporated into a user device 340. In some implementations, optical device 310 may receive information from and/or transmit information to another device in environment 300, such as user device 340. Optical device 310 may include one or more processors 320, described in more detail in connection with FIG. 4, and/or optical sensor 330.

Optical sensor 330 includes a device capable of sensing light. For example, optical sensor 330 may include an image sensor, a multispectral sensor, a spectral sensor, and/or the like. In some implementations, optical sensor 330 may include a silicon (Si) based sensor, an indium-gallium-arsenide (InGaAs) based sensor, a lead-sulfide (PbS) based sensor, or a germanium (Ge) based sensor, may utilize one or more sensor technologies, such as a complementary metal-oxide-semiconductor (CMOS) technology, or a charge-coupled device (CCD) technology, among other examples. In some implementations, optical sensor 330 may include a front-side illumination (FSI) sensor, a back-side illumination (BSI) sensor, and/or the like. In some implementations, optical sensor 330 may be included in a camera of optical device 310 and/or user device 340.

User device 340 includes one or more devices capable of receiving, generating, storing, processing, and/or providing an image associated with a subject. For example, user device 340 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device may include a display screen (e.g., display screen 102) for displaying the image associated with the subject. In some implementations, user device 340 may receive information from and/or transmit information to another device in environment 300, such as optical device 310.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. For example, although optical device 310 and user device 340 are described as separate devices, optical device 310 and user device 340 may be implemented as a single device. Additionally, or alternatively, a set of devices (e.g., one or more devices) of environment 300 may perform one or more functions described as being performed by another set of devices of environment 300.

Figure 4:
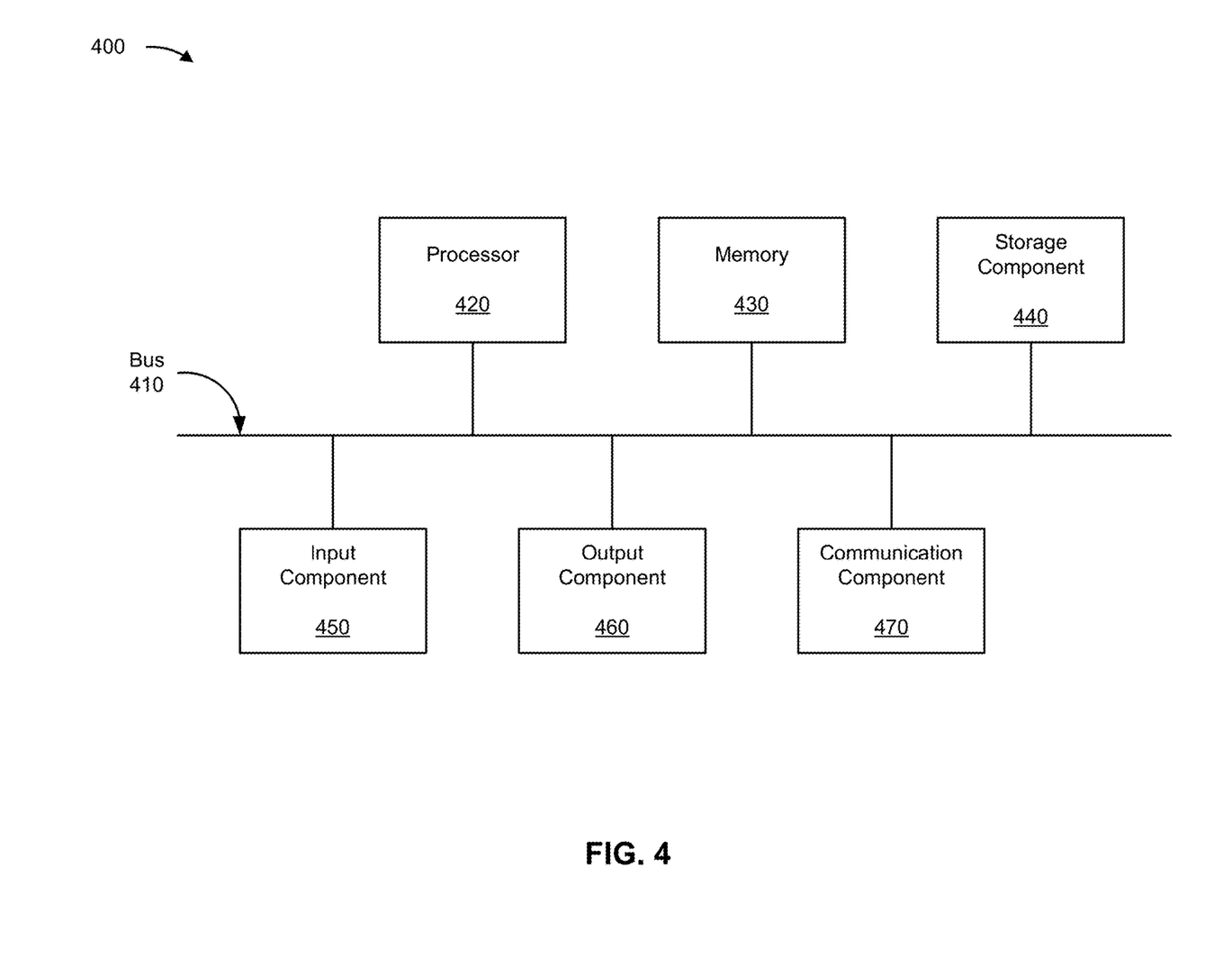
FIG. 4 is a diagram of example components of one or more devices of FIG. 3.

FIG. 4 is a diagram of example components of a device 400, which may correspond to optical device 310 and/or user device 340. In some implementations, optical device 310 and/or user device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
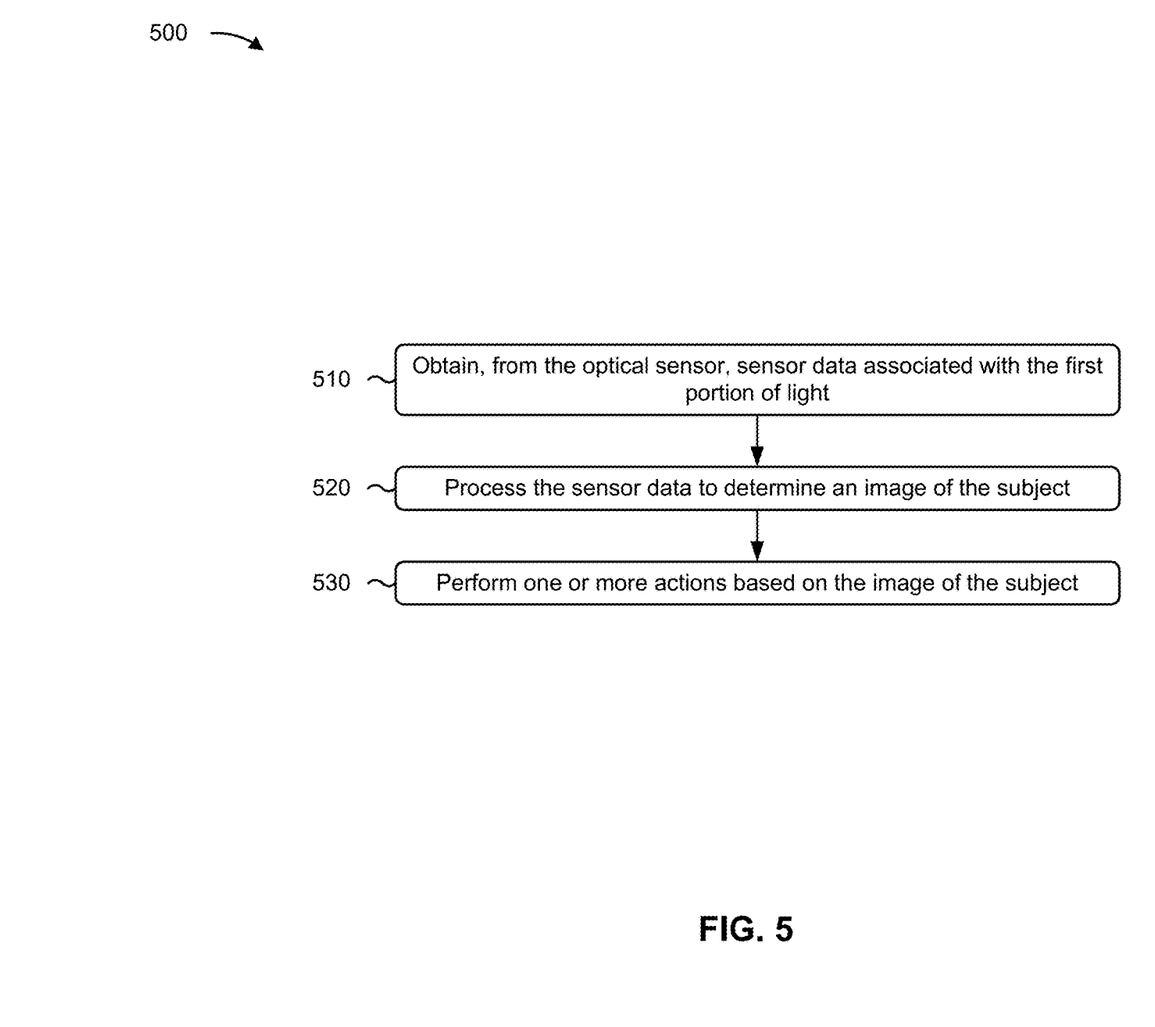
FIGS. 5-7 are flowcharts of example processes relating to an optical device.

FIG. 5 is a flowchart of an example process 500 associated with an optical device (e.g., optical device 310). In some implementations, one or more process blocks of FIG. 5 may be performed by a one or more processors (e.g., one or more processors 132 or one or more processors 320) of the optical device. In some implementations, one or more process blocks of FIG. 5 may be performed by another device or a group of devices separate from or including the one or more processors, such as a user device (e.g., user device 340). Additionally, or alternatively, one or more process blocks of FIG. 5 may be performed by one or more components of device 400, such as processor 420, memory 430, storage component 440, input component 450, output component 460, and/or communication component 470.

In some implementations, the optical device may include, in addition to the one or more processors, an optical sensor comprising an array of sensor elements and one or more diffusive optical elements disposed on a surface of a display screen. The one or more diffusive optical elements may be configured to diffuse and to distribute a first portion of light associated with a subject across the array of sensor elements of the optical sensor. The display screen may comprise one or more transmissive components that allow the first portion of light to pass through the display screen via the surface of the display screen, and one or more blocking components that prevent a second portion of light associated with the subject from passing through the display screen.

As shown in FIG. 5, process 500 may include obtaining, from the optical sensor, sensor data associated with the first portion of light (block 510). For example, the one or more processors may obtain, from the optical sensor, sensor data associated with the first portion of light, as described above.

As further shown in FIG. 5, process 500 may include processing the sensor data to determine an image of the subject (block 520). For example, the one or more processors may process the sensor data to determine an image of the subject, as described above.

As further shown in FIG. 5, process 500 may include performing one or more actions based on the image of the subject (block 530). For example, the one or more processors may perform one or more actions based on the image of the subject, as described above.

Process 500 may include additional implementations, such as any single implementation or any combination of implementations described below and/or in connection with one or more other processes described elsewhere herein.

In a first implementation, the one or more transmissive components include one or more pixel components of the display screen.

In a second implementation, alone or in combination with the first implementation, the one or more transmissive components include one or more window components of the display screen, wherein a window component is positioned between a first pixel component of the display screen and a second pixel component of the display screen.

In a third implementation, alone or in combination with one or more of the first and second implementations, the one or more transmissive components include one or more gaps between pixel components of the display screen.

In a fourth implementation, alone or in combination with one or more of the first through third implementations, the one or more blocking components include one or more circuitry components of the display screen.

In a fifth implementation, alone or in combination with one or more of the first through fourth implementations, processing the sensor data to determine the image of the subject includes processing the sensor data to identify a first set of sensor data, of the sensor data, associated with the first portion of light, processing the sensor data to identify a second set of sensor data, of the sensor data, associated with light emitted by one or more pixel components of the display screen, and processing the first set of sensor data, and not the second set of sensor data, to determine the image of the subject.

In a sixth implementation, alone or in combination with one or more of the first through fifth implementations, processing the sensor data to determine the image of the subject includes determining calibration information associated with a circuitry architecture of the display screen, causing an algorithm for constructing an image based on light diffused by the one or more diffusive optical elements to be optimized based on the calibration information, and processing, using the algorithm, the sensor data to determine the image of the subject.

In a seventh implementation, alone or in combination with one or more of the first through sixth implementations, processing the sensor data to determine the image of the subject includes processing the sensor data using a machine learning model to determine the image of the subject.

In an eighth implementation, alone or in combination with one or more of the first through seventh implementations, performing the one or more actions includes retraining the machine learning model based on the image of the subject.

In a ninth implementation, alone or in combination with one or more of the first through eighth implementations, the subject is a face of a user of the optical device and performing the one or more actions includes processing the image of the subject using facial recognition analysis.

In a tenth implementation, alone or in combination with one or more of the first through ninth implementations, performing the one or more actions includes causing display of the image of the subject on the display screen.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
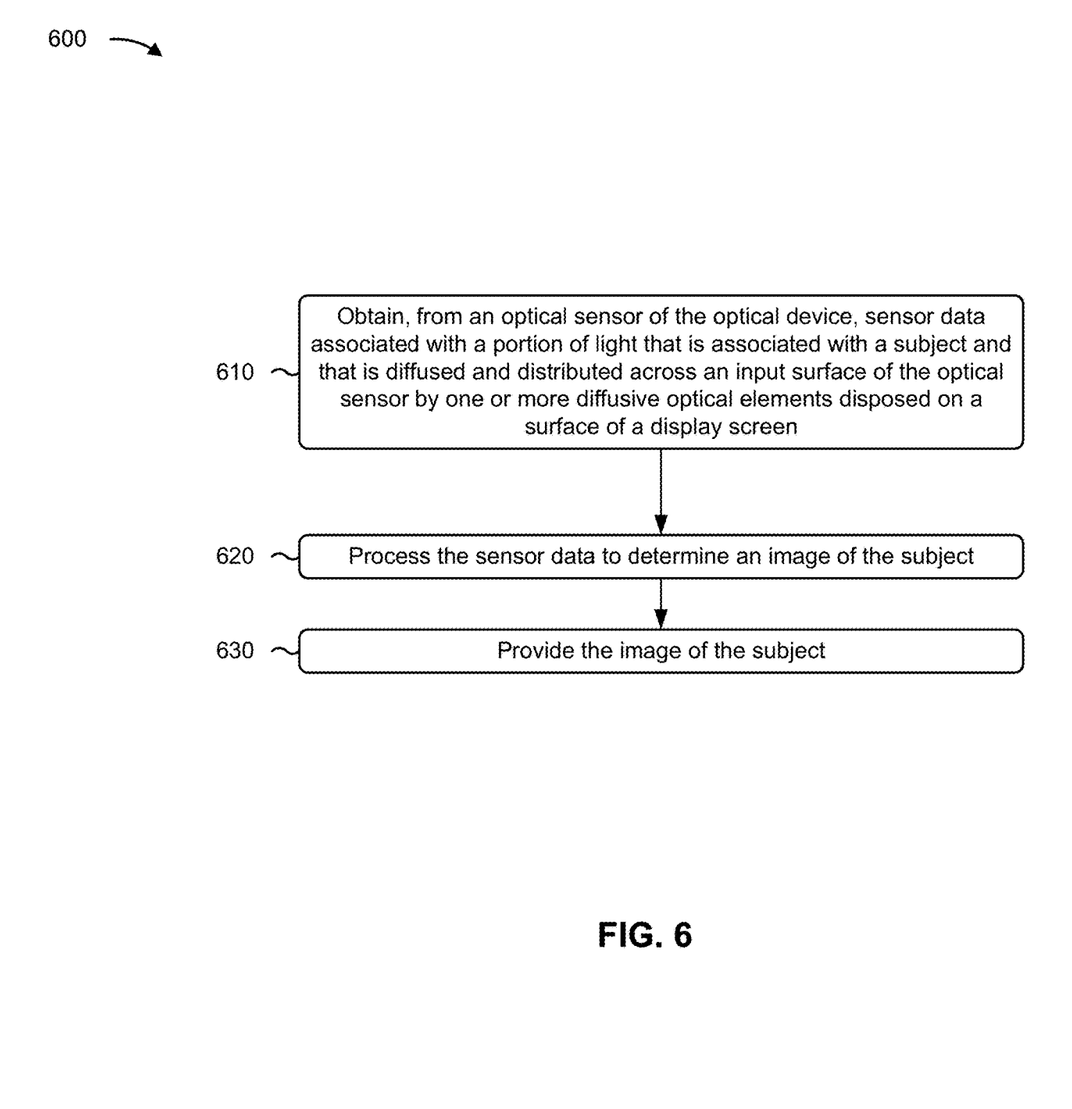

FIG. 6 is a flowchart of an example process 600 associated with an optical device (e.g., optical device 310). In some implementations, one or more process blocks of FIG. 6 may be performed by a one or more processors (e.g., one or more processors 132 or one or more processors 320) of the optical device. In some implementations, one or more process blocks of FIG. 6 may be performed by another device or a group of devices separate from or including the one or more processors, such as a user device (e.g., user device 340). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include obtaining, from an optical sensor of the optical device, sensor data associated with a portion of light that is associated with a subject and that is diffused and distributed across an input surface of the optical sensor by one or more diffusive optical elements disposed on a surface of a display screen (block 610). For example, the one or more processors may obtain, from an optical sensor of the optical device, sensor data associated with a portion of light that is associated with a subject and that is diffused and distributed across an input surface of the optical sensor by one or more diffusive optical elements disposed on a surface of a display screen, as described above. In some implementations, the display screen comprises one or more transmissive components that allow the portion of light to pass through the display screen. In some implementations, the display screen comprises one or more blocking components that prevent a different portion of light associated with the subject from passing through the display screen.

As further shown in FIG. 6, process 600 may include processing the sensor data to determine an image of the subject (block 620). For example, the one or more processors may process the sensor data to determine an image of the subject, as described above.

As further shown in FIG. 6, process 600 may include providing the image of the subject (block 630). For example, the one or more processors may provide the image of the subject, as described above.

Process 600 may include additional implementations, such as any single implementation or any combination of implementations described below and/or in connection with one or more other processes described elsewhere herein.

In a first implementation, providing the image of the subject includes causing display of the image of the subject on the display screen.

In a second implementation, alone or in combination with the first implementation, providing the image of the subject includes sending the image of the subject to another device to cause the other device to process the image of the subject using facial recognition analysis.

In a third implementation, alone or in combination with one or more of the first and second implementations, processing the sensor data to determine the image of the subject includes identifying an algorithm for constructing an image based on light diffused by the one or more diffusive optical elements disposed on the surface of the display screen, and processing the sensor data using the algorithm to determine the image of the subject.

In a fourth implementation, alone or in combination with one or more of the first through third implementations, processing the sensor data to determine the image of the subject includes processing the sensor data using a machine learning model to determine the image of the subject.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
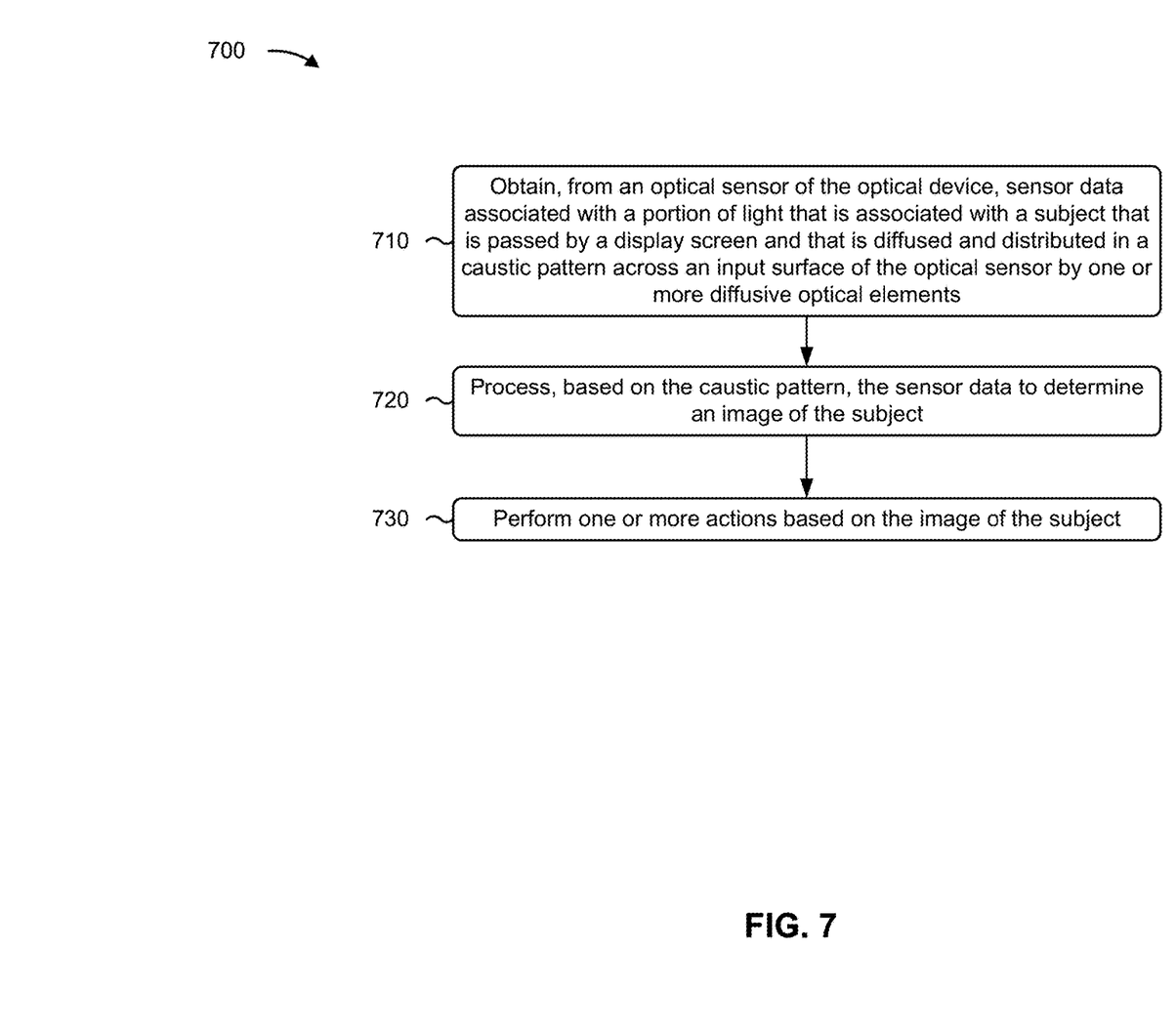

FIG. 7 is a flowchart of an example process 700 associated with an optical device (e.g., optical device 310). In some implementations, one or more process blocks of FIG. 7 may be performed by the optical device. In some implementations, one or more process blocks of FIG. 7 may be performed by another device or a group of devices separate from or including the optical device, such as a user device (e.g., user device 340). Additionally, or alternatively, one or more process blocks of FIG. 7 may be performed by one or more components of device 400, such as processor 420, memory 430, storage component 440, input component 450, output component 460, and/or communication component 470.

As shown in FIG. 7, process 700 may include obtaining, from an optical sensor of the optical device, sensor data associated with a portion of light that is associated with a subject that is passed by a display screen and that is diffused and distributed in a caustic pattern across an input surface of the optical sensor by one or more diffusive optical elements (block 710). For example, the optical device may obtain, from an optical sensor of the optical device, sensor data associated with a portion of light that is associated with a subject that is passed by a display screen and that is diffused and distributed in a caustic pattern across an input surface of the optical sensor by one or more diffusive optical elements, as described above.

As further shown in FIG. 7, process 700 may include processing, based on the caustic pattern, the sensor data to determine an image of the subject (block 720). For example, the optical device may process, based on the caustic pattern, the sensor data to determine an image of the subject, as described above.

As further shown in FIG. 7, process 700 may include performing one or more actions based on the image of the subject (block 730). For example, the optical device may perform one or more actions based on the image of the subject, as described above.

Process 700 may include additional implementations, such as any single implementation or any combination of implementations described below and/or in connection with one or more other processes described elsewhere herein.

In a first implementation, the display screen comprises one or more transmissive components that allow the portion of light to pass through the display screen and one or more blocking components that prevent a different portion of light associated with the subject from passing through the display screen.

In a second implementation, alone or in combination with the first implementation, processing the sensor data to determine the image of the subject comprises at least one of processing the sensor data using an algorithm to determine the image of the subject, wherein the algorithm is configured to construct an image based on the caustic pattern, or processing the sensor data using a machine learning model to determine the image of the subject based on the caustic pattern.

In a third implementation, alone or in combination with one or more of the first and second implementations, performing the one or more actions comprises at least one of causing display of the image of the subject on the display screen, causing the image of the subject to be processed using a facial recognition analysis technique, or causing a machine learning model to be retrained based on the image of subject, wherein the machine learning model was used to process the sensor data to determine the image of the subject.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
an optical sensor comprising an array of sensor elements; and
one or more diffusive optical elements disposed on a surface of a display screen and configured to diffuse and to distribute a first portion of light, reflected from a subject, across the array of sensor elements of the optical sensor,
wherein the display screen comprises one or more transmissive components that allow the first portion of light, reflected from the subject, to pass through the display screen via the surface of the display screen, and
wherein the display screen comprises one or more blocking components that prevent a second portion of light, reflected from the subject from passing through the display screen.

2. The optical device of claim 1, wherein the one or more transmissive components include one or more pixel components of the display screen.

3. The optical device of claim 1, wherein the one or more transmissive components include one or more window components of the display screen, and
wherein a window component, of the one or more window components, is positioned between a first pixel component of the display screen and a second pixel component of the display screen.

4. The optical device of claim 1, wherein the one or more transmissive components include one or more gaps between pixel components of the display screen.

5. The optical device of claim 1, wherein the one or more blocking components include one or more circuitry components of the display screen.

6. The optical device of claim 1, further comprising one or more processors,
wherein the one or more processors are configured to:
obtain, from the optical sensor, sensor data associated with the first portion of light reflected from the subject;
process the sensor data to determine an image of the subject; and
perform one or more actions based on the image of the subject.

7. The optical device of claim 6, wherein the one or more processors are configured to, when processing the sensor data to determine the image of the subject:
process the sensor data to identify a first set of sensor data, of the sensor data, associated with the first portion of light reflected from the subject;
process the sensor data to identify a second set of sensor data, of the sensor data, associated with light emitted by one or more pixel components of the display screen; and
process the first set of sensor data, and not the second set of sensor data, to determine the image of the subject.

8. The optical device of claim 6, wherein the one or more processors are configured to, when processing the sensor data to determine the image of the subject:
determine calibration information associated with a circuitry architecture of the display screen;
cause an algorithm for constructing an image based on light diffused by the one or more diffusive optical elements to be optimized based on the calibration information; and
process, using the algorithm, the sensor data to determine the image of the subject.

9. The optical device of claim 6, wherein the one or more processors are configured to, when processing the sensor data to determine the image of the subject:
process the sensor data using a machine learning model to determine the image of the subject.

10. The optical device of claim 6, wherein the subject is a face of a user of the optical device, and
wherein the one or more processors are configured to, when performing the one or more actions:
process the image of the subject using facial recognition analysis.

11. The optical device of claim 6, wherein the one or more processors are configured to, when performing the one or more actions:
cause display of the image of the subject on the display screen.

12. A non-transitory computer-readable medium storing instructions, the instructions comprising:
one or more instructions that, when executed by one or more processors of an optical device, cause the one or more processors to:
obtain, from an optical sensor of the optical device, sensor data associated with a portion of light that is reflected from a subject and that is diffused and distributed across an input surface of the optical sensor by one or more diffusive optical elements disposed on a surface of a display screen,
wherein the display screen comprises one or more transmissive components that allow the portion of light to pass through the display screen, and
wherein the display screen comprises one or more blocking components that prevent a different portion of light associated with the subject from passing through the display screen;
process the sensor data to determine an image of the subject; and
provide the image of the subject.

13. The non-transitory computer-readable medium of claim 12, wherein the one or more instructions, that cause the optical device to provide the image of the subject, cause the optical device to:
cause display of the image of the subject on the display screen.

14. The non-transitory computer-readable medium of claim 12, wherein the one or more instructions, that cause the optical device to provide the image of the subject, cause the optical device to:
send the image of the subject to another device to cause the other device to process the image of the subject using facial recognition analysis.

15. The non-transitory computer-readable medium of claim 12, wherein the one or more instructions, that cause the optical device to process the sensor data to determine the image of the subject, cause the optical device to:
identify an algorithm for constructing an image based on light diffused by the one or more diffusive optical elements disposed on the surface of the display screen; and process the sensor data using the algorithm to determine the image of the subject.

16. The non-transitory computer-readable medium of claim 12, wherein the one or more instructions, that cause the optical device to process the sensor data to determine the image of the subject, cause the optical device to:
process the sensor data using a machine learning model to determine the image of the subject.

17. A method, comprising:
obtaining, by an optical device and from an optical sensor of the optical device, sensor data associated with a portion of light that is reflected from a subject, that is passed by a display screen, and that is diffused and distributed in a caustic pattern across an input surface of the optical sensor by one or more diffusive optical elements;
processing, by the optical device and based on the caustic pattern, the sensor data to determine an image of the subject; and
performing, by the optical device, one or more actions based on the image of the subject.

18. The method of claim 17, wherein the display screen comprises one or more transmissive components that allow the portion of light to pass through the display screen and one or more blocking components that prevent a different portion of light associated with the subject from passing through the display screen.

19. The method of claim 17, wherein processing the sensor data to determine the image of the subject comprises at least one of:
processing the sensor data using an algorithm to determine the image of the subject,
wherein the algorithm is configured to construct an image based on the caustic pattern; or
processing the sensor data using a machine learning model to determine the image of the subject based on the caustic pattern.

20. The method of claim 17, wherein performing the one or more actions comprises at least one of:
causing display of the image of the subject on the display screen;
causing the image of the subject to be processed using a facial recognition analysis technique; or
causing a machine learning model to be retrained based on the image of subject, and
wherein the machine learning model is used to process the sensor data to determine the image of the subject.

* * * * *